Sept. 3, 1957   C. H. PICKARD   2,804,912
VENTILATED CUSHION
Filed Nov. 23, 1955   2 Sheets-Sheet 1
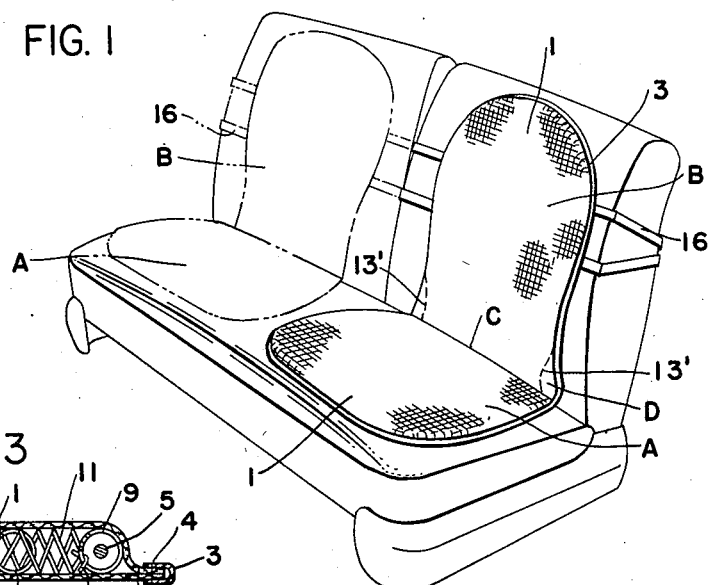
FIG. 1
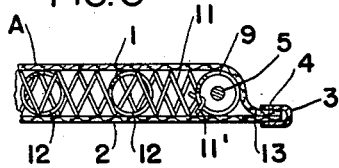
FIG. 3
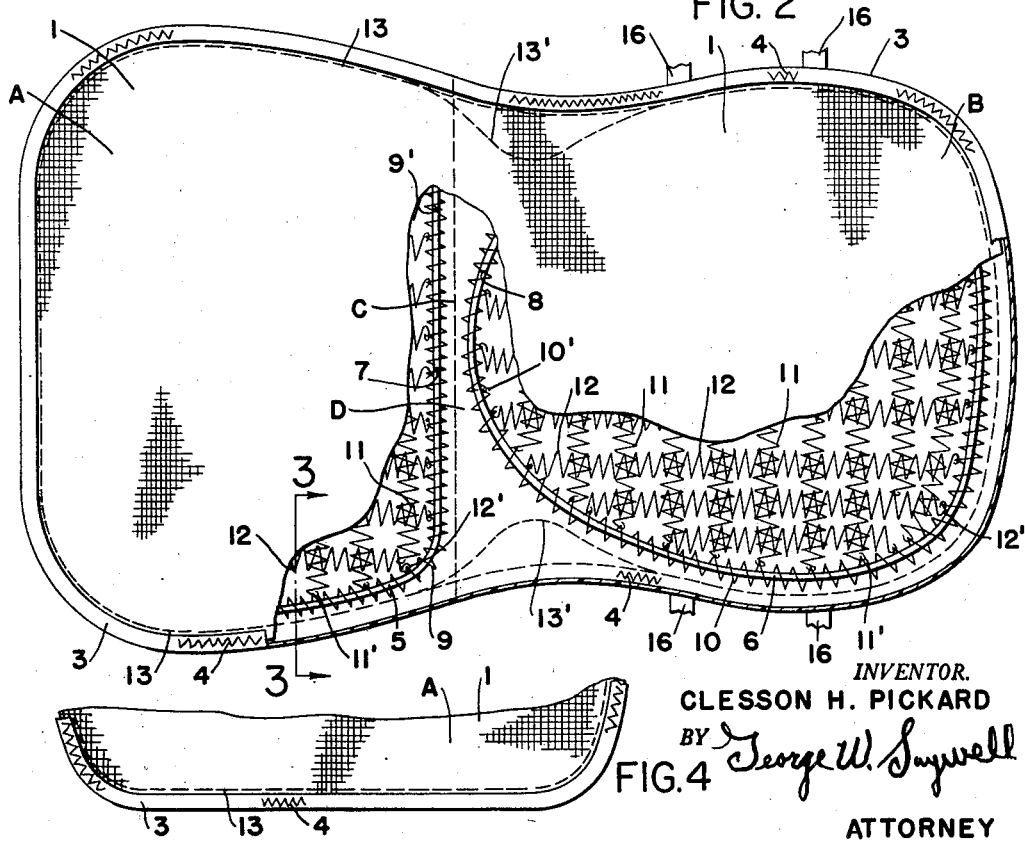
FIG. 2
FIG. 4
INVENTOR.
CLESSON H. PICKARD
BY 
ATTORNEY Sept. 3, 1957 C. H. PICKARD 2,804,912
VENTILATED CUSHION
Filed Nov. 23, 1955 2 Sheets-Sheet 2

INVENTOR.
CLESSON H. PICKARD
BY
George W. Saywell
ATTORNEY

… … … … … …

United States Patent Office 2,804,912
Patented Sept. 3, 1957

2,804,912
VENTILATED CUSHION

Clesson H. Pickard, Fremont, Ohio, assignor to The S. E. Hyman Company, Fremont, Ohio, a corporation of Ohio Application November 23, 1955, Serial No. 548,632

1 Claim. (Cl. 155—182)

The invention relates to ventilated seat covers, and particularly to devices of this character adaptable for use as cushions, more particularly for use as cushions for the seats and back rests of automobiles. The purposes of the invention are to provide a device which can be used to provide a ventilated cover for such automobile seats and back rests which will not materially bend in use out of the plane which the cover normally occupies so as to be uncomfortable to the person sitting thereon and also cut down the circulation of air.

Specifically, the device relates to a cushioning air-pervious frame contained within an enclosing housing of reticulated formation, which frame is formed of coiled wire sections loosely secured at their ends to a rigid peripheral wire member and extended in different directions and loosely interlaced in their intersecting areas.

The annexed drawing and the following description set forth in detail certain structure illustrating the improvements in seat covers, such structure showing, however, only one form in which the principle of the invention can be embodied.

In said annexed drawing:

Figure 1 is a perspective view of two of the covers mounted on a seat and the back rest of an automobile, the view illustrating the use of two covers of compound type wherein each cover serves as cushions for both the automobile seat and back rest;

Figure 2 is a top plan of one of the compound covers wherein the back rest cover has been folded down into the plane of the automobile seat cover, the view being partially broken away to disclose the structure of a main frame filler enclosed by upper and lower reticulated flat face members forming an air-pervious envelope;

Figure 3 is a section, upon an enlarged scale, taken in the plane indicated by the line 3—3, Figure 2, and particularly illustrating the interlocking of certain longitudinal and crosswise coiled wires forming part of the inner main frame or body of the improved seat cover;

Figure 4 is a fragmentary plan view illustrating the position of a certain inner stitching line when only one of the compound seat covers is used;

Figure 5:
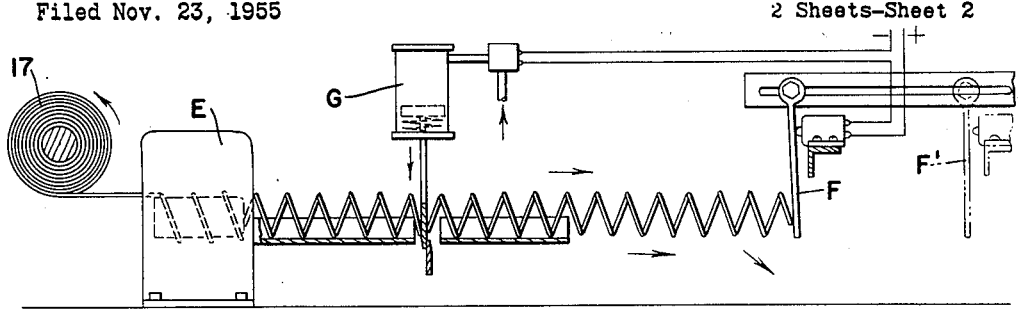
Figure 5 is a schematic diagram illustrating the coiling from straight wire of the longitudinal and cross wires forming part of the inner frame of the seat cover, and the cutting of the coiled wire into lengths suitable for the longitudinal frame members and lengths suitable for the transverse frame members.

Referring to the annexed drawing in which the same parts are designated by the same respective characters in the several views, the improved seat cover comprises a seat section A and a back rest section B adapted to be used in the nature of cushions upon a seat and against the back rest of an automobile, as illustrated in Figure 1. The back rest section B is removably held by a strap 16 tied on the rear of the back rest. The cover sections A and B are connected by a foldable fabric section D, Figure 2, so that they can be folded relatively to each other and, if it is so desired, either the seat section A or the back rest section B can be used separately, as is hereinafter more fully referred to.

The cover sections A and B have an outer air-pervious envelope of reticulated formation consisting of a front face portion 1 and a rear face portion 2, Figure 3. A hem 3 covers the adjacent outer edges of the face members 1 and 2 and is held by a line of stitching 4.

The enclosing envelope 1—2 is held distended by a comparatively heavy marginal wire indicated by 5 for the seat section A, and by 6 for the back rest section B, Figures 2 and 3. The ends of the wire 5 and the wire 6 are welded together, as indicated by the respective designations 7 and 8, Figure 2, or, if desired, the ends of these wires 5 and 6 may be secured together in any other suitable manner such as enclosing them in indented sleeves which hold the ends together.

Loosely coiled on the heavy marginal wire 5 is a comparatively light wire 9, Figure 3, and loosely coiled on the comparatively heavy marginal wire 6 is a comparatively light wire 10, Figure 2, these respective coiled wires 9 and 10 having adjacent hook end formations 9' and 10' which are fastened to the respective heavy wires 5 and 6 and also fastened to each other.

The cushion frame or body interiorly of the marginal coiled wires 9 and 10 is comprised of two loosely interlocked series of spaced coiled wires, a transverse series of coiled wires 11, and a longitudinal series of coiled wires 12, Figure 3. These coils 11 and 12 have hooked ends 11' and 12', respectively, which are loosely fastened to the marginal coiled wire 9 or, in the case of the back rest B, loosely fastened to the marginal coiled wire 10.

The transverse series of coiled wires 11 are loosely superposed upon the longitudinal series of coiled wires 12, alternate convolutions of the transverse wires 11 engaging the longitudinal coiled wires 12 between the walls of each second or third convolution of the longitudinal coiled wires 12. The transverse wires 11 are just dropped in between the coils of the longitudinal wires 12 so that there is freedom of movement between the coils of the series of wires 11 and the coils of the series of wires 12.

Any suitable spacing of the coiled wires of the series 11 and the coiled wires of the series 12 may be utilized according to the desired distribution of the resistance to stresses or the overall shape of the seat cover. It has been found desirable to place the adjacent wires of the longitudinal wires 12 at the sides of the cover in more closely adjacent relation than those wires comprising the interior of the frame for the purpose of better resisting the stresses to which the frame is subjected. It will be noted that the drawing, Figures 2 and 8, so illustrates the spacing of a side longitudinal wire 12 since the transverse coils 11 seat therein at about one-half the distance apart of the longitudinal wires 12 as compared with the longitudinal wires 12 at the center spring section of the frame. As stated, this provides additional marginal strength as a resistance to bending any part of the frame out of its normal plane and, also, the particular shape of the frame may vary the spacing that is suitable for the marginal portion thereof.

Adjacently interior of the hem 3 is a stitching 13, Figures 2, 3 and 4, which holds together the front face 1 and the rear face 2 of the enclosing envelope adjacently interior of the hem 3, the shape of the interior body or frame of the back rest cushion B permitting this stitch line 13 to be indented upon both sides of the compound cover A—B for some distance upon both sides of the bend line C, as indicated by 13', Figure 2. If only a single cover A or a single cover B is desired, the stitching 13 extends across the fabric D connecting the face portions 1 and 2 of the reticulated housing, as indicated in Figure 4.

A method of forming the improved cover is as follows, and the description of the method relates both to the section A and the section B of the compound seat cover shown, since, except for the varying shapes of these two seat covering portions and the varying distribution of the transverse frame wires 11 and the longitudinal frame wires 12, the two sections are similarly constructed and similarly made.

Figure 6:
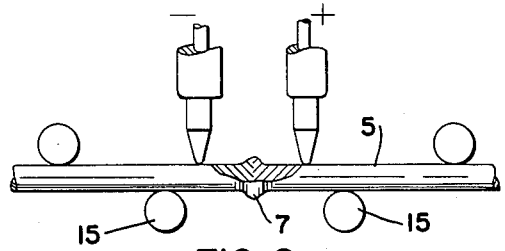
Figure 6 is a schematic showing illustrating the method forming the peripheral comparatively heavy member of the frame of the seat cover.
Figure 7:
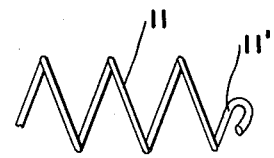
Figure 7 is a fragmentary showing of one of the cross wires having an end hook portion by which it is secured to a light wire coiled about the comparatively heavy marginal wire shown in Figure 6.
Figure 8:
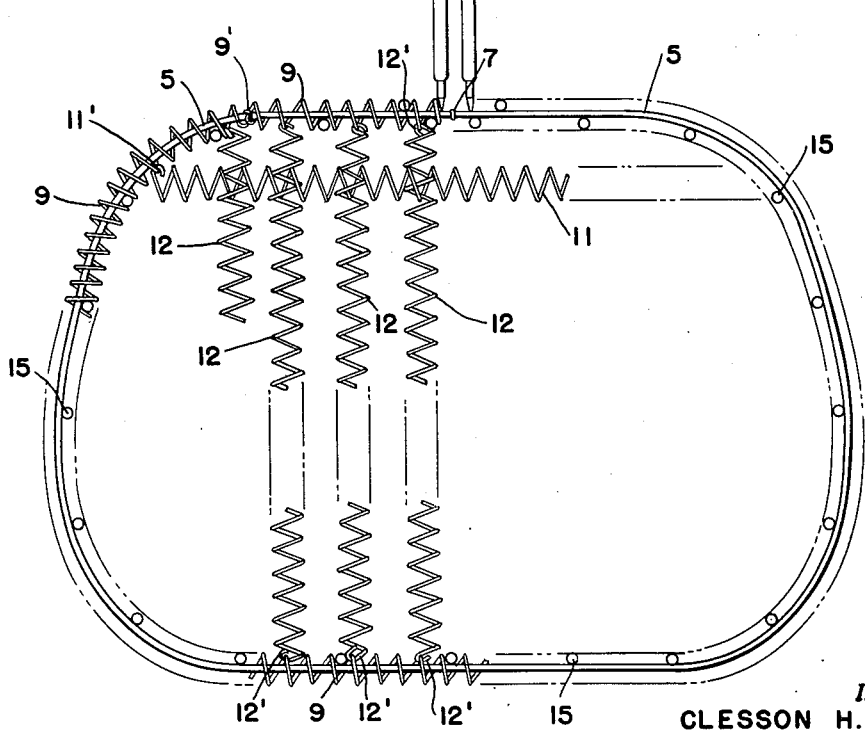
Figure 8 is a fragmentary showing indicating the body or main frame formed by the use of the material and equipment illustrated in Figures 5, 6, and 7.

First, a closed ring of spaced pegs 15, Figure 8, is formed which establishes the outline of the comparatively heavy marginal wire 5. Wire of suitable gauge is wound around these pegs 15 and the ends thereof suitably secured together as by welding, Figure 6, or by any other suitable means such as by the use of short sleeves. Then a comparatively light wire 9 is coiled around the marginal wire 5 and hook ends 9' thereof fastened about the heavy wire 5 and to each other. Straight wire 17, Figure 5, of about the gauge of the wire 9 is fed into a coiling machine E and the forward end of the coiled formation thereof encounters a suitably spaced stop F which activates a solenoid G and results in a cutting off of a desired length of coiled wire. This operation is repeated according to the number of coils of such length that is desired, and then the stop F is moved to position F', for instance, for the purpose of cutting off any desired number of coiled wires of another length. These are the wires for the respective series of spaced transverse wires 11 and the series of spaced longitudinal wires 12. The ends of the two wires 11 and 12 of suitable lengths are then curled into hook formation, Figure 7, and these ends secured to the convolutions of the marginal light wire 9 at such suitable spacing of the coils 11 and at such suitable spacing of the coils 12 as is desired, the convolutions of the transverse wires 11 being dropped in between the convolutions of the longitudinal wires 12, as indicated in Figures 2 and 8. Then the reticulated housing parts 1 and 2 of the desired shape and size are applied around the spring frame and the stitching 13 formed. Then the peripheral edges of the reticulated housing parts 1 and 2 are compressed together and the hem 3 fastened thereover by the stitching 4.

What I claim is:

A ventilated cushion for seats comprising a relatively stiff marginal foundation wire defining the peripheral outline of a cushion frame, a coiled wire loosely encircling said marginal wire, a series of spaced coiled wires extending across the cushion frame in one direction and connected at their ends to the marginal coiled wire, a second series of spaced coiled wires extending across the frame in an intersecting direction and also connected to the marginal coiled wire, the convolutions of the two series of wires being loosely connected at their intersecting areas, the adjacent wires of one of the two series of coiled wires being disposed in closer relation one to the other adjacent the periphery of said cushion frame than are the wires of said same series in the central portion of the cushion frame, and an air-pervious envelope for the latter.

References Cited in the file of this patent

UNITED STATES PATENTS

| | | |
|---|---|---|
| 1,911,276 | Harley | May 30, 1933 |
| 2,020,028 | Hanauer | Nov. 5, 1935 |
| 2,051,494 | Mitchell et al. | Aug. 18, 1936 |